(12) United States Patent
Best et al.

(10) Patent No.: US 8,627,061 B1
(45) Date of Patent: *Jan. 7, 2014

(54) METHOD AND SYSTEM FOR EMPLOYING A FIXED IP ADDRESS BASED ENCRYPTION DEVICE IN A DYNAMIC IP ADDRESS BASED NETWORK

(75) Inventors: Randy Best, Phoenix, AZ (US); Paul D. Coppinger, Mesa, AZ (US); Thomas S. Bradford, Phoenix, AZ (US)

(73) Assignee: Apriva, LLC, Scottsdale, AZ (US)

( * ) Notice: Subject to any disclaimer, the term of this patent is extended or adjusted under 35 U.S.C. 154(b) by 770 days.

This patent is subject to a terminal disclaimer.

(21) Appl. No.: 12/546,513

(22) Filed: Aug. 24, 2009

Related U.S. Application Data

(60) Provisional application No. 61/091,671, filed on Aug. 25, 2008.

(51) Int. Cl.
*H04L 12/28* (2006.01)

(52) U.S. Cl.
USPC .......................... 713/153; 370/392; 370/229

(58) Field of Classification Search
USPC ........... 713/153, 160; 370/349, 389, 392, 229
See application file for complete search history.

(56) References Cited

U.S. PATENT DOCUMENTS

| | | | |
|---|---|---|---|
| 6,496,867 B1 | 12/2002 | Beser et al. | |
| 7,215,667 B1 | 5/2007 | Davis | |
| 7,904,711 B2 | 3/2011 | Mackey et al. | |
| 7,911,959 B2 | 3/2011 | Ayyagari et al. | |
| 7,961,624 B2 | 6/2011 | Kronewitter et al. | |
| 7,984,293 B2 | 7/2011 | Winslow | |
| 2002/0015422 A1 | 2/2002 | Inada et al. | |
| 2002/0038419 A1 | 3/2002 | Garrett et al. | |
| 2003/0131263 A1 | 7/2003 | Keane et al. | |
| 2004/0037284 A1* | 2/2004 | Bergek et al. | 370/392 |
| 2007/0076599 A1* | 4/2007 | Ayyagari et al. | 370/229 |
| 2010/0135287 A1 | 6/2010 | Hosain et al. | |

OTHER PUBLICATIONS

Charles Perkins, IP Encapsulation within IP, Oct. 1996, Network Working Group, pp. 1-14.*
Office Action dated Mar. 28, 2012 in U.S. Appl. No. 12/546,525.
Office Action dated Jun. 11, 2012 in U.S. Appl. No. 12/546,536.
Final Office Action dated Dec. 13, 2012 in U.S. Appl. No. 12/546,536.
Final Office Action dated Dec. 31, 2012 in U.S. Appl. No. 12/546,525.
D. Farinacci, "Generic Routing Encapsulation (GRE))", RFC 2784, Oct. 1996, 10 pages.

* cited by examiner

*Primary Examiner* — Brandon Hoffman
*Assistant Examiner* — Samuel Ambaye
(74) *Attorney, Agent, or Firm* — Snell & Wilmer, LLP

(57) ABSTRACT

A network operations center (130) provides secure communication between fixed IP address based encryption devices (114,154) in an enclave (110) and on a handheld communication device (150) deployed on a dynamic IP address based wireless carrier network (140). In communication from the enclave (110) to the handheld device (150) a fixed IP address based data packet (310) is obtained from the enclave (110) and encapsulated into a network data packet (320) which is provided over the wireless carrier network (140) to the handheld device (150) for decapsulating the fixed IP address based data packet (410) from the network data packet (320). In communication from the handheld device (150) to the enclave (110) a fixed IP address based data packet (710) is decapsulated from a network data packet (620) into which it has been encapsulated by the handheld device (150) and provided to the enclave (110).

16 Claims, 4 Drawing Sheets

METHOD AND SYSTEM FOR EMPLOYING A FIXED IP ADDRESS BASED ENCRYPTION DEVICE IN A DYNAMIC IP ADDRESS BASED NETWORK

CROSS REFERENCE TO RELATED APPLICATION

This patent application claims priority from the provisional application 61/091,671 filed on Aug. 25, 2008.

FIELD OF THE INVENTION

The present invention relates to data communication and, more particularly, the encryption of data communicated over a wireless network.

BACKGROUND OF THE INVENTION

Security is a major concern in data communication. One means of securing data communications is encryption, wherein the data is transformed utilizing a cryptographic algorithm (encrypted) into an unrecognizable form before transfer and then transformed using a corresponding cryptographic algorithm (decrypted) back into its original form by the intended recipient by means available only to the recipient or to a limited number of intended parties. The data is thereby rendered undiscoverable by unintended parties.

In securing data communication over an open network that is not confined to a locally secured network, hardware inline encryption devices may be utilized to encrypt the data communicated over the open network. Such devices may include Internet Protocol Security (IPSec) encryption devices which utilize the IPSec protocol suite. These encryption devices may have security associations that require fixed (unchanging) internet protocol (IP) addresses in order to be correctly identified when communicating with other encryption devices. The utilization of such encryption devices provides the potential for an exceptionally high level of security in network communications.

It would be advantageous to provide such a high level of security in communications involving handheld wireless communication devices such as mobile phones or personal digital assistants (PDAs.) These handheld devices typically utilize wireless networks that are only intermittently connected and require the utilization of dynamic internet protocol (IP) addresses for data communication. For this reason, it has not been possible to utilize in such a network a hardware inline network encryptor such as an IPSec encryption device or any other encryption device that requires the use of fixed IP addresses. A means is therefore desired for employing fixed IP address based encryption devices in a dynamic IP address based communication environment.

BRIEF DESCRIPTION OF THE DRAWINGS

The invention is described in terms of the preferred embodiments set out below and with reference to the following drawings in which like reference numerals are used to refer to like elements throughout.

DETAILED DESCRIPTION OF THE PREFERRED EMBODIMENTS

Figure 1:
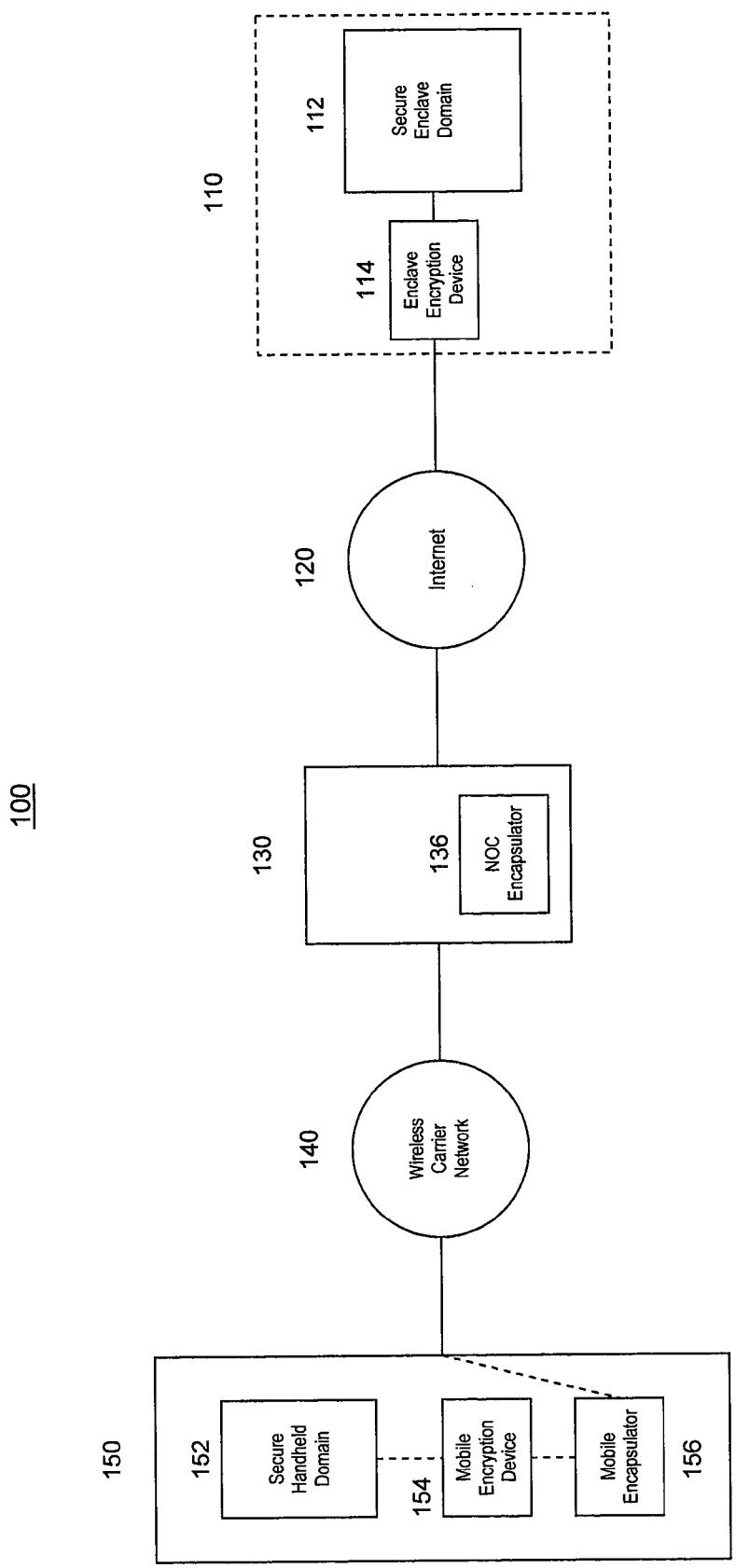
FIG. 1 is a block diagram illustrating a system in which secure data communication is provided in accordance with an embodiment of the present invention.

In an embodiment of the invention described herein, a method and system are provided for utilizing fixed internet protocol (IP) address based encryption devices in communicating data between an enclave and a handheld communication device deployed on a dynamic IP address based wireless carrier network. The handheld communication device may be, for example, a mobile phone or personal digital assistant (PDA.) The fixed IP address based encryption devices are, for example, Internet Protocol Security (IPSec) devices. An enclave fixed IP address based encryption device is provided within the enclave and a mobile fixed IP address based encryption device is provided on the handheld communication device.

In data communication from the enclave to the handheld communication device, the enclave fixed IP address based encryption device encrypts the data and provides to an intermediate system (via, for example, the internet) a fixed IP address based data packet containing a fixed source IP address, a fixed destination IP address, and the encrypted data. The intermediate system obtains the fixed IP address based data packet from the enclave and encapsulates the fixed IP address based data packet into a network data packet containing a network source IP address, a network destination IP address, and the encapsulated fixed IP address based data packet. The intermediate system provides the network data packet to the handheld communication device over the dynamic IP address based wireless carrier network. The handheld communication device decapsulates the fixed IP address based data packet from the network data packet and provides the fixed IP address based data packet to the mobile fixed IP address based encryption device.

In data communication from the handheld communication device to the enclave, the mobile fixed IP address based encryption device encrypts the data and provides a fixed IP address based data packet containing a fixed source IP address, a fixed destination IP address, and the encrypted data. The handheld communication device encapsulates the fixed IP address based data packet into a network data packet containing a network source IP address, a network destination IP address, and the encapsulated fixed IP address based data packet. The handheld communication device provides the network data packet over the dynamic IP address based wireless carrier network to the intermediate system, which decapsulates the fixed IP address based data packet from the network data packet. The intermediate system provides the decapsulated fixed IP address based data packet (via, for example, the internet) to the enclave, where the enclave fixed IP address based encryption device decrypts the data.

The method and system described above provides the ability to utilize fixed IP address based encryption devices in data communications between and enclave and a handheld communication device that is deployed on a dynamic IP address based wireless carrier network. This allows for the advantages provided by such devices to be extended to popular mobile devices such as mobile phones and PDAs that utilize wireless carrier networks which require dynamic IP addressing. Such advantages may include the high level of security provided by IPSec devices. Sensitive applications such as secure email can thereby be securely extended to wireless handheld devices that communicate via dynamic IP address based wireless carrier networks.

FIG. 1 is a block diagram illustrating a communication system 100 in which secure data communication are provided in accordance with an embodiment of the present invention. In FIG. 1, an enclave 110 is provided which includes a secure enclave domain 112 and an enclave encryption device 114 resident in the enclave 110. The enclave 110 can be any commercial or government entity which requires a high degree of data security. The secure enclave domain 112 may contain a number of computer systems and internal networks that are highly protected from outside access by firewalls and other means. Such computer systems may include servers for email and other applications. When such applications need to send data outside the secure enclave domain 112, the data is encrypted by the enclave encryption device 114 before being sent outside the enclave 110. Similarly, when applications receive data from outside the secure enclave domain 112, the data is decrypted by the enclave encryption device 114 before being provided to the secure enclave domain 112.

The enclave encryption device 114 can be any fixed internet protocol (IP) address based encryption device appropriate to the system at hand. As defined herein, a fixed IP address based encryption device is an encryption device that requires fixed (unchanging) IP addresses in securely communicating with a corresponding encryption device. The enclave encryption device 114 is, for example, an inline network encryption device, such as an IPSec encryption device, which has security associations that require fixed IP addresses in order to be correctly identified when communicating with other IPSec encryption devices. Examples of such devices are HAIPE® devices such as the ViaSat KG-250 IP network encryptor as well as many general purpose network appliances such as Cisco 2801/3855 routers with appropriate encryption options.

The enclave 110 communicates via the enclave encryption device 114 over a network such as the internet 120 with a network operations center 130. The network operations center 130 includes a network operations center (NOC) encapsulator 136 which performs encapsulation and decapsulation of data packets allowing for the data to be communicated over a dynamic IP address based wireless carrier network 140 that requires the utilization of dynamic (potentially changing) IP addresses. The wireless carrier network may be, for example, a wireless network provided by AT&T, T-Mobile, Sprint, Verizon, or any of a variety of European carriers. The network operations center 130 may contain numerous other components (not shown) which facilitate and secure data communication. In one advantageous embodiment, the network operations center 130 contains a multi-protocol router which provides routing supporting communication over a variety of networks and network types utilizing different data communication protocols.

The network operations center 130 provides an intermediate system which sends and receives data over the wireless carrier network 140 to and from a handheld communication device 150. The handheld communication device 150 is, for example, a personal electronic device (PED) such as a mobile phone or personal digital assistant (PDA) which includes a memory capable of storing software applications, a processor capable of performing software applications and a transceiver capable of sending and receiving data utilized by such applications. The handheld communication device 150 includes a secure handheld domain 152 which is protected from outside access such that sensitive applications can be performed such as secure email. When such applications need to send or receive data outside the secure handheld domain 152, the data is, before being sent, encrypted by a mobile encryption device 154 resident on the handheld communication device 150 and, after being obtained, decrypted by the mobile encryption device 154 after being obtained.

The mobile encryption device 154 can be any fixed internet protocol (IP) address based encryption component, such as a hardware and software based inline encryptor suitable to reside on the handheld communication device 150. Where the enclave encryption device 114 is a HAIPE® device, for example, the mobile encryption device 154 provides, corresponding HAIPE® functionality. The mobile encryption device 154 is, for example, a conventional handset encryptor adapted to perform IPSec encryption and decryption functions.

The handheld communication device 150 further includes a mobile encapsulator 156 which encapsulates data packets from the mobile encryption device 154 before the handheld communication device 150 sends the data over the wireless carrier network 140 and decapsulates data packets obtained over the wireless carrier network 140 before being provided to the mobile encryption device 154. This allows for the data to be transferred over the wireless carrier network 140 with the required capability of dynamic IP addresses while still being processed by the mobile encryption device 154 utilizing fixed IP addresses as required.

It should be understood that the representation of the subcomponents of the handheld communication device 150 is functional in nature and does not necessarily correspond directly to independent hardware components. The mobile encapsulator 156, for example, may be implemented in software stored in a same physical memory and executed by a same processor as other functional elements of the secure handheld domain which are protected by firewalls and/or other well-known means. However, the mobile encapsulator 156, which does not handle unencrypted data and is thus does not require the same level of protection as other elements of the secure handheld domain 152, is shown separate from the secure handheld domain 152 to illustrate that its function is performed between that of the mobile encryption device 154 and communication over the wireless carrier network 140.

Figure 2:
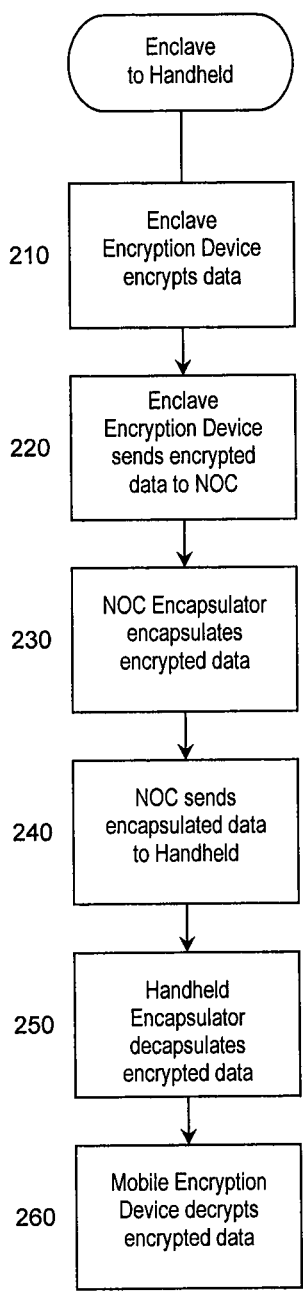
FIG. 2 is a flow diagram illustrating secure communication from an enclave to a handheld communication device in accordance with an embodiment of the present invention.

FIG. 2 is a flow diagram illustrating the process of secure communication from an enclave to a handheld communication device in accordance with an embodiment of the present invention. In step 210, the enclave encryption device 114 encrypts data from the secure enclave domain 112 that is destined for the handheld communication device 150 and places the encrypted data into a fixed IP address based data packet. In one potential implementation, the enclave encryption devices also digitally signs a destination IP address of the mobile encryption device 154. In step 220, the enclave encryption device 114 sends the encrypted data to the network operations center 130 by sending the fixed IP address based data packets via the internet 120 to the network operations center 130.

Figure 3:
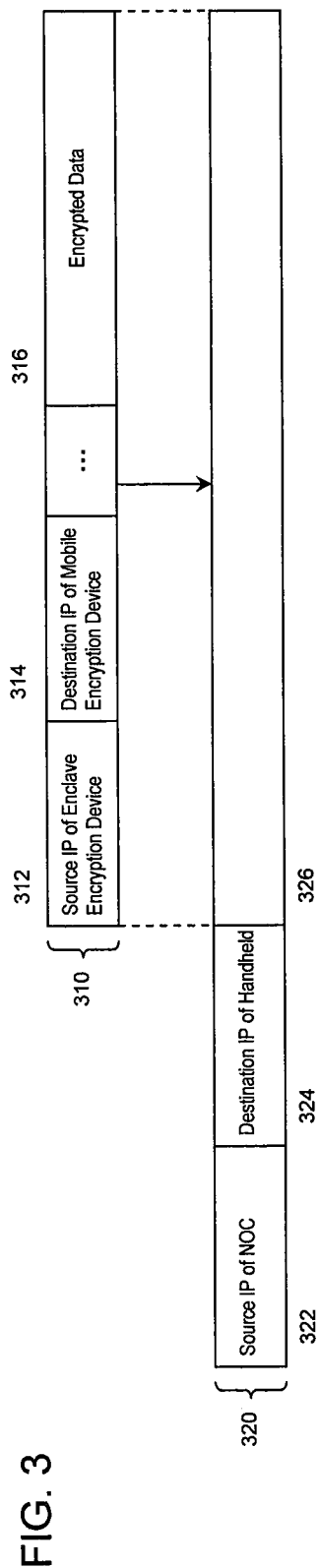
FIG. 3 is a block diagram illustrating encapsulation of a fixed IP address based data packet into a network data packet performed by a network operation center in enclave to handheld communication device communication in accordance with an embodiment of the present invention.

In step 230, the NOC encapsulator 136 of the network operations center 130 encapsulates the fixed IP address based data packets into dynamic IP address based network data packets. FIG. 3 is a block diagram illustrating encapsulation of the fixed IP address based data packet into a network data packet performed by the network operation center in enclave to handheld communication. As shown in FIG. 3, the fixed IP address based data packet 310 contains, along with any other appropriate data, a source IP address 312 of the enclave encryption device 114, a destination IP address 314 of a the mobile encryption device 154 for which the data is destined, and encrypted data 316. The network operations center 130 encapsulates the fixed IP address based data packet 310 into a network data packet 320 which contains, along with any other appropriate data, a source IP address 322 of the network operations center 130, a destination IP address 324 of the handheld communication device 150, and the encapsulated fixed IP address based data packet 326 as the data payload for the network data packet 320.

In step 240, the NOC encapsulator 136 of the network operations center 130 sends the encapsulated encrypted data in dynamic IP address based data packets (each in the form of a network data packet 320 as described above) over the dynamic IP address based wireless carrier network 140 to the handheld communication device 150.

Figure 4:
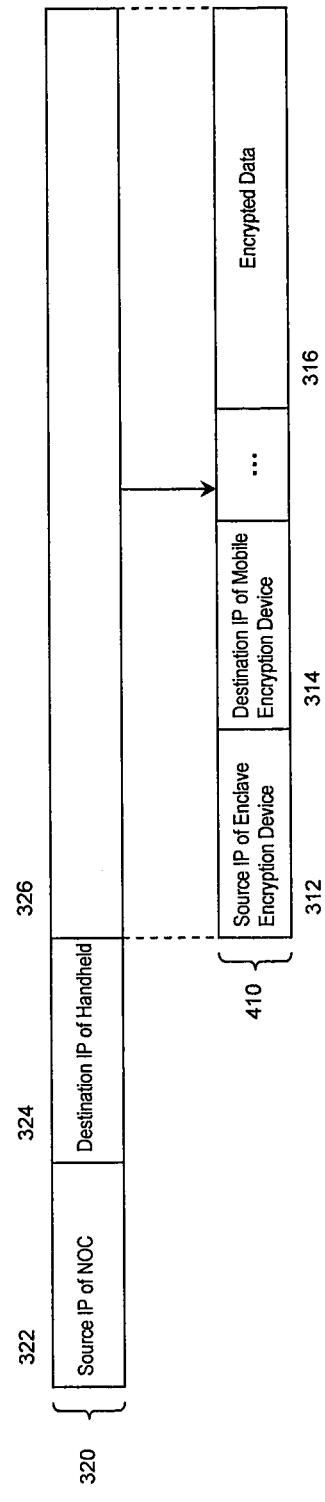
FIG. 4 is a block diagram illustrating decapsulation of a network data packet to a fixed IP address based data packet performed by a handheld wireless communication device in enclave to handheld communication device communication in accordance with an embodiment of the present invention.

In step 250, the mobile encapsulator 156 of the handheld communication device 150 decapsulates the encrypted data obtained over the wireless carrier network 140. FIG. 4 is a block diagram illustrating decapsulation of a network data packet to a fixed IP address based data packet performed by a handheld wireless communication device in enclave to handheld communication. In FIG. 4, a decapsulated fixed IP address based data packet 410 is extracted from the encapsulated fixed IP address based data packet 326 of the network data packet 320. The content of the decapsulated fixed IP address based data packet 410 is thus the same as the content of the original fixed IP address based data packet 310. That is, the decapsulated fixed IP address based data packet 410 contains the source IP address 312 of the enclave encryption device 114, the destination IP address 314 of the mobile encryption device 154, and the encrypted data 316.

In step 260, the mobile encryption device 154 decrypts the encrypted data to securely obtain the data originally provided by the enclave 110. Because the data has now been decapsulated into fixed IP address based data packets, it is in the form required for the mobile encryption device 154 despite the fact that it has traversed a dynamic IP address based wireless carrier network. The mobile encryption device 154 decrypts the encrypted data 316 from the decapsulated fixed IP address based data packets 410. The decrypted data may now be utilized by secure applications within the secure handheld domain 152.

Figure 5:
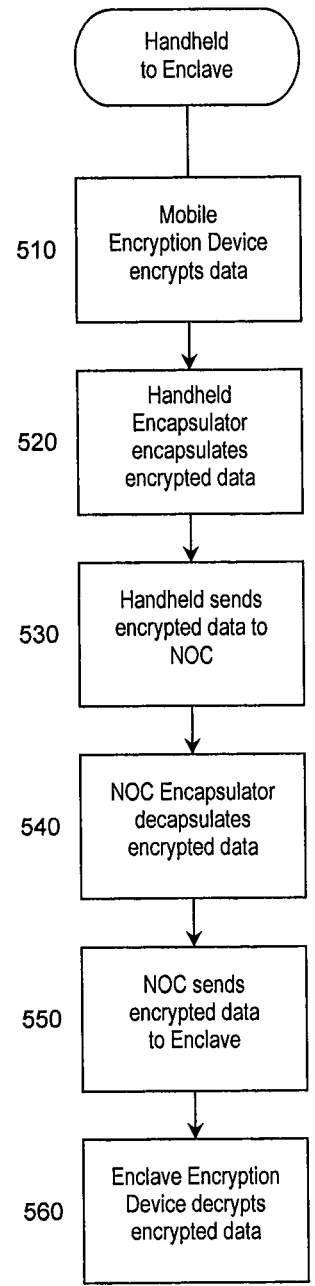
FIG. 5 is a flow diagram illustrating secure communication from a handheld communication device to an enclave in accordance with an embodiment of the present invention.

FIG. 5 is a flow diagram illustrating secure communication from a handheld communication device to an enclave in accordance with an embodiment of the present invention. In step 510, the mobile encryption device 154 encrypts data from the secure handheld domain 152 destined for the enclave 110 and places the encrypted data into a fixed IP address based data packet. In one potential implementation, the mobile encryption device 154 also digitally signs the destination IP address of the enclave encryption device 114.

Figure 6:
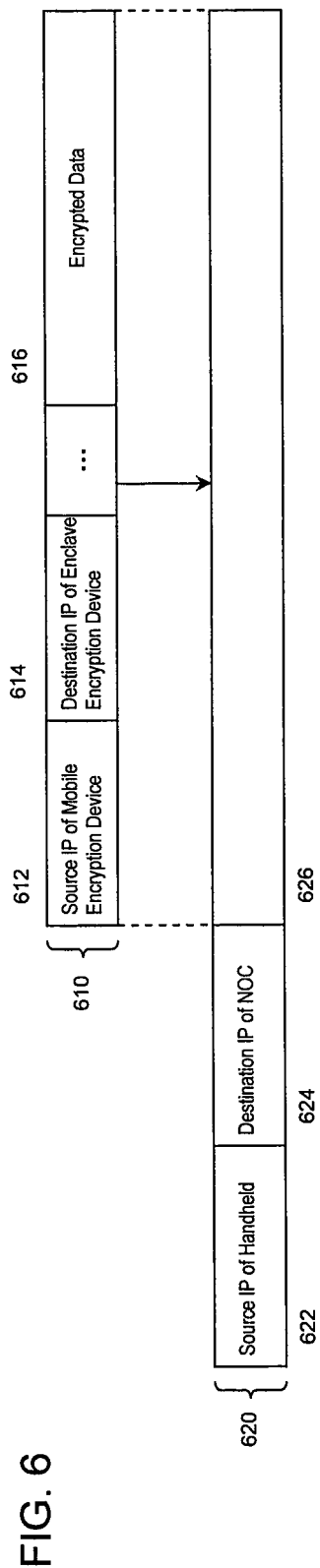
FIG. 6 is a block diagram illustrating encapsulation of a fixed IP address based data packet into a network data packet performed by a handheld wireless communication device in handheld communication device to enclave communication in accordance with an embodiment of the present invention.

In step 520, the mobile encapsulator 156 encapsulates the fixed IP address based data packets into dynamic IP address based network data packets. FIG. 6 is a block diagram illustrating encapsulation of a fixed IP address based data packet into a network data packet performed by a handheld wireless communication device in handheld to enclave communication. In FIG. 6, the fixed IP address based data packet 610 contains, along with any other appropriate data such as other header data, a source IP address 612 of the mobile encryption device 154, a destination IP address 614 of the enclave encryption device 114 for which the data is destined, and encrypted data 616. The mobile encapsulator 156 encapsulates the fixed IP address based data packet 610 into a network data packet 620 which contains, along with any other appropriate data, a source IP address 622 of the handheld communication device 150, a destination IP address 624 of the network operations center 130, and the encapsulated fixed IP address based data packet 626 as the data payload for the network data packet 620.

In step 530, the handheld communication device 150 sends the encapsulated encrypted data to the network operations center 130 by sending the dynamic IP address based network data packets over the wireless carrier network 140 to the network operations center 130.

In step 540, the NOC encapsulator 136 of the network operations center 130 decapsulates the fixed IP address based data packets from the network data packets.

Figure 7:
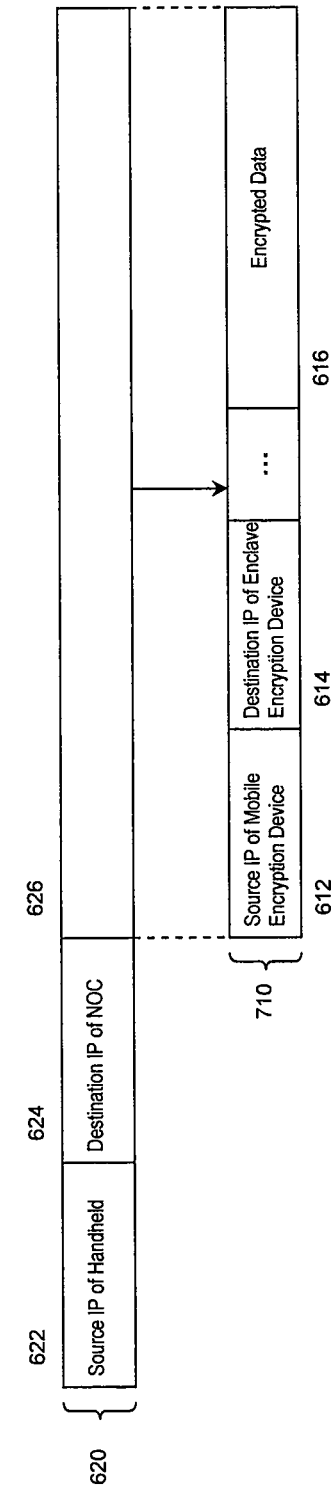
FIG. 7 is a block diagram illustrating decapsulation of a network data packet to a fixed IP address based data packet performed by a network operation center in handheld communication device to enclave communication in accordance with an embodiment of the present invention.

FIG. 7 is a block diagram illustrating decapsulation of a network data packet to a fixed IP address based data packet performed by a network operation center in handheld to enclave communication in accordance with an embodiment of the present invention. In FIG. 7, a decapsulated fixed IP address based data packet 710 is extracted from the encapsulated fixed IP address based data packet 626 of the network data packet 620. The content of the decapsulated fixed IP address based data packet 710 is thus the same as the content of the original fixed IP address based data packet 610. That is, the decapsulated fixed IP address based data packet 710 contains the source IP address 612 of the mobile encryption device 154, the destination IP address 614 of the enclave encryption device 114 of the enclave 110, and the encrypted data 616.

In step 550, the decapsulated encrypted data is sent to the enclave 110 by sending each decapsulated fixed IP address based data packet 710 via the internet 120 to the enclave encryption device 114 of the enclave 110. In step 560, the enclave encryption device 114 decrypts the data to securely obtain the data originally provided by the enclave 110. Because the data has now been decapsulated into fixed IP address based data packets, it is in the form required for the mobile encryption device 154 to be able to decrypt it despite the fact that it has traversed a dynamic IP address based wireless carrier network. The enclave encryption device 114 decrypts the encrypted data 616 from the decapsulated fixed IP address based data packets 710. The decrypted data may now be utilized by the secure enclave domain 112.

The invention has been described above with reference to one or more illustrative embodiments. Based on this description, further modifications and improvements may occur to those skilled in the art. The claims are intended to cover all such modifications and changes as fall within the scope and spirit of the invention. Unless otherwise stated or implied, function components of the invention may be implemented as hardware, software, firmware or some combination thereof as will be found appropriate and practicable by one of ordinary skill in the art.

The invention claimed is:

1. A system for securely communicating data from an enclave to a handheld communication device deployed on a dynamic internet protocol address based wireless carrier network, the system implemented as an intermediate system provided between the enclave and the handheld communication device and comprising: means for obtaining from an enclave fixed internet protocol address based encryption device resident in the enclave a fixed internet protocol address based data packet containing a fixed source internet protocol address, a fixed destination internet protocol address, and encrypted data encrypted by the enclave fixed internet protocol address based encryption device; an encapsulator for encapsulating the fixed internet protocol address based data packet into a network data packet containing a network source internet protocol address, a network destination internet protocol address, and the encapsulated fixed internet protocol address based data packet; and means for providing the network data packet over the dynamic interact protocol address based wireless carrier network to the handheld communication device for decapsulating the fixed internet protocol address based data packet from the network data packet and providing the decapsulated fixed internet protocol address based data packet to a mobile fixed internet protocol address based encryption device resident on the handheld communication device for decryption of the encrypted data; wherein the fixed source internet protocol address is of the enclave fixed internet protocol address based encryption device and the fixed destination interact protocol address is of the mobile fixed internet protocol address based encryption device.

2. The system of claim 1 wherein at least one of the enclave fixed internet protocol address based encryption device and the mobile fixed internet protocol address based encryption device is an IPSec encryption device.

3. The system of claim 1 wherein at least one of the enclave fixed internet protocol address based encryption device and the mobile fixed internet protocol address based encryption device is a High Assurance Internet Protocol Encryptor.

4. The system of claim 1 wherein the network source internet protocol address is of the intermediate system and the network destination internet protocol address is of the handheld communication device.

5. A system for securely communicating data between an enclave and a handheld communication device deployed on a dynamic internet protocol address based wireless carrier network, the system implemented as an intermediate system provided between the enclave and the handheld communication device and comprising: means for obtaining from the handheld communication device over the dynamic internet protocol address based wireless carrier network a network data packet containing a network source internet protocol address, a network destination internet protocol address, and a fixed internet protocol address based data packet encapsulated within the network data packet by the handheld communication device, the fixed internet protocol address based data packet containing a fixed source internet protocol address, a fixed destination internet protocol address, and encrypted data encrypted by a mobile fixed internet protocol address based encryption device resident on the handheld communication device; an encapsulator for decapsulating the fixed internet protocol address based data packet from the network data packet; and means for providing the decapsulated fixed internet protocol address based data packet to the enclave for decryption of the encrypted data by an enclave fixed internet protocol address based encryption device resident in the enclave; wherein the fixed source internet protocol address is of the mobile fixed internet protocol address based encryption device and the fixed destination internet protocol address is of the enclave fixed internet protocol address based encryption device.

6. The system of claim 5 wherein at least one of the enclave fixed internet protocol address based encryption device and the mobile fixed internet protocol address based encryption device is an IPSec encryption device.

7. The system of claim 5 wherein at least one of the enclave fixed internet protocol address based encryption device and the mobile fixed internet protocol address based encryption device is a High Assurance Internet Protocol Encryptor.

8. The system of claim 5 wherein the network source internet protocol address is of the handheld communication device and the network destination internet protocol address is of the intermediate system.

9. A method of securely communicating data from an enclave to a handheld communication device deployed on a dynamic internet protocol address based Wireless carrier network, the method performed by an intermediate system provided between the enclave and the handheld communication device and comprising the steps of: obtaining from an enclave fixed internet protocol address based encryption device resident in the enclave a fixed internet protocol address based data packet containing a fixed source internet protocol address, a fixed destination internet protocol address, and encrypted data encrypted by the enclave fixed internet protocol address based encryption device; encapsulating the fixed internet protocol address based data packet into a network data packet containing a network source internet protocol address, a network destination internet protocol address, and the encapsulated fixed internet protocol address based data packet; and providing the network data packet over the dynamic internet protocol address based wireless carrier network to the handheld communication device for decapsulating the fixed internet protocol address based data packet from the network data packet and providing the decapsulated fixed internet protocol address based data packet to a mobile fixed internet protocol address based encryption device resident on the handheld communication device for decryption of the encrypted data; wherein the fixed source internet protocol address is of the enclave fixed internet protocol address based encryption device and the fixed destination internet protocol address is of the mobile fixed internet protocol address based encryption device.

10. The method of claim 9 wherein at least one of the enclave fixed internet protocol address based encryption device and the mobile fixed internet protocol address based encryption device is an IPSec encryption device.

11. The method of claim 9 wherein at least one of the enclave fixed internet protocol address based encryption device and the mobile fixed internet protocol address based encryption device is a High Assurance Internet Protocol Encryptor.

12. The method of claim 9 wherein the network source internet protocol address is of an intermediate system and the network destination internet protocol address is of the handheld communication device.

13. A method of securely communicating data to an enclave from a handheld communication device deployed on a dynamic internet protocol address based wireless carrier network, the method performed by an intermediate system provided between the enclave and the handheld communication device and comprising the steps of: obtaining from the handheld communication device over the dynamic internet protocol address based wireless carrier network a network data packet containing a network source internet protocol address, a network destination internet protocol address, and a fixed internet protocol address based data packet encapsulated within the network data packet by the handheld communication device, the fixed internet protocol address based data packet containing a fixed source internet protocol address, a fixed destination internet protocol address, and encrypted data encrypted by a mobile fixed internet protocol address based encryption device resident on the handheld communication device; decapsulating the fixed internet protocol address based data packet from the network data packet; and providing the decapsulated fixed internet protocol address based data packet to the enclave for decryption of the encrypted data by an enclave fixed internet protocol address based encryption device resident in the enclave; wherein the fixed source internet protocol address is of the mobile fixed internet protocol address based encryption device and the fixed destination internet protocol address is of the enclave fixed internet protocol address based encryption device.

14. The method of claim 13 wherein at least one of the enclave fixed internet protocol address based encryption device and the mobile fixed internet protocol address based encryption device is an IPSec encryption device.

15. The method of claim 13 wherein at least one of the enclave fixed internet protocol address based encryption device and the mobile fixed internet protocol address based encryption device is a High Assurance Internet Protocol Encryptor.

16. The method of claim 13 wherein the network source internet protocol address is of the handheld communication device and the network destination internet protocol address is of an intermediate system.

* * * * *